United States Patent
Li et al.

(10) Patent No.: US 11,513,394 B2
(45) Date of Patent: Nov. 29, 2022

(54) DUAL-DIE DEVICE, DISPLAY DEVICE AND DRIVING METHOD OF DISPLAY DEVICE

(71) Applicants: Chongqing BOE Optoelectronics Technology Co., Ltd., Chongqing (CN); BOE TECHNOLOGY GROUP CO., LTD., Beijing (CN)

(72) Inventors: Dengqian Li, Beijing (CN); Hebing Ma, Beijing (CN); Sijun Lei, Beijing (CN); Liang Gao, Beijing (CN); Yansheng Sun, Beijing (CN); Chaojie Zhang, Beijing (CN); Jian Chen, Beijing (CN)

(73) Assignees: CHONGQING BOE OPTOELECTRONICS TECHNOLOGY CO., LTD., Chongqing (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/762,270

(22) PCT Filed: Dec. 4, 2019

(86) PCT No.: PCT/CN2019/122951
§ 371 (c)(1),
(2) Date: May 7, 2020

(87) PCT Pub. No.: WO2020/155841
PCT Pub. Date: Aug. 6, 2020

(65) Prior Publication Data
US 2021/0215978 A1    Jul. 15, 2021

(30) Foreign Application Priority Data

Jan. 30, 2019    (CN) .......................... 201910094193.4

(51) Int. Cl.
*G09G 3/34* (2006.01)
*G02F 1/1335* (2006.01)
(Continued)

(52) U.S. Cl.
CPC ....... *G02F 1/133624* (2021.01); *G02B 6/005* (2013.01); *G02B 6/0068* (2013.01);
(Continued)

(58) Field of Classification Search
CPC ... H01L 33/50; H01L 25/0753; G09G 3/3611; G09G 3/3413
See application file for complete search history.

(56) References Cited

U.S. PATENT DOCUMENTS 9,231,034 B1 * 1/2016 Chen ................... H01L 27/3218
10,128,415 B2   11/2018 Huang et al.
(Continued)

FOREIGN PATENT DOCUMENTS

| CN | 101365907 A | 2/2009 |
| CN | 204143409 U | 2/2015 |

(Continued)

OTHER PUBLICATIONS

Office Action dated Mar. 23, 2020, issued in counterpart CN Application No. 201910094193.4, with English Translation. (21 pages).

(Continued)

*Primary Examiner* — Kevin M Nguyen
(74) *Attorney, Agent, or Firm* — WHDA, LLP

(57) ABSTRACT

A dual-die device, a display device and a driving method thereof are provided. The dual-die device includes: a first light emitting die for emitting light containing short-wave blue light; a second light emitting die for emitting light from which short-wave blue light is filtered out; and a control circuit. The control circuit is connected to the first light (Continued)

emitting die and the second light emitting die, and configured to control the first light emitting die or the second light emitting die to be turned on.

24 Claims, 6 Drawing Sheets

(51) Int. Cl.
*H05B 47/155* (2020.01)
*H05B 45/10* (2020.01)
*F21V 8/00* (2006.01)

(52) U.S. Cl.
CPC ........... *G09G 3/3406* (2013.01); *H05B 45/10* (2020.01); *H05B 47/155* (2020.01); *G09G 2320/0626* (2013.01)

(56) References Cited

U.S. PATENT DOCUMENTS

| | | | |
|---|---|---|---|
| 10,416,496 B2 | 9/2019 | Yang et al. | |
| 10,546,203 B2 | 1/2020 | Lin et al. | |
| 10,572,747 B2 | 2/2020 | Lius | |
| 10,578,271 B1* | 3/2020 | Chen | H01L 33/54 |
| 10,816,853 B2 | 10/2020 | Yang | |
| 2007/0120808 A1* | 5/2007 | Shimoda | G09G 3/3611 345/102 |
| 2007/0236934 A1 | 10/2007 | Chang et al. | |
| 2008/0165102 A1 | 7/2008 | Tsai et al. | |
| 2010/0109566 A1* | 5/2010 | Kang | G09G 3/3413 315/294 |
| 2011/0109851 A1 | 5/2011 | Ono et al. | |
| 2016/0198542 A1* | 7/2016 | Chiang | H05B 45/20 315/294 |
| 2016/0372637 A1 | 12/2016 | Huang et al. | |
| 2017/0187005 A1* | 6/2017 | Li | H01L 51/56 |
| 2018/0348574 A1 | 12/2018 | Lin et al. | |
| 2018/0349719 A1 | 12/2018 | Lius | |
| 2019/0101792 A1 | 4/2019 | Yang et al. | |
| 2020/0117930 A1 | 4/2020 | Lin et al. | |
| 2020/0124919 A1 | 4/2020 | Yang | |

FOREIGN PATENT DOCUMENTS

| | | |
|---|---|---|
| CN | 104865746 A | 8/2015 |
| CN | 105546419 A | 5/2016 |
| CN | 106322225 A | 1/2017 |
| CN | 206134136 U | 4/2017 |
| CN | 206161888 U | 5/2017 |
| CN | 107121837 A | 9/2017 |
| CN | 107422527 A | 12/2017 |
| CN | 107678207 A | 2/2018 |
| CN | 108134003 A | 6/2018 |
| CN | 108845461 A | 11/2018 |
| CN | 108877690 A | 11/2018 |
| CN | 108983466 A | 12/2018 |
| CN | 109669299 A | 4/2019 |
| JP | 2004-078102 A | 3/2004 |

OTHER PUBLICATIONS

Office Action dated Oct. 9, 2021, issued in counterpart CN application No. 201910094193.4, with English translation. (20 pages).

* cited by examiner

DUAL-DIE DEVICE, DISPLAY DEVICE AND DRIVING METHOD OF DISPLAY DEVICE

CROSS-REFERENCE TO RELATED APPLICATION

This application is a Section 371 National Stage Application of International Application No. PCT/CN2019/122951, filed on Dec. 4, 2019 and entitled with "DUAL DIE DEVICE, DISPLAY DEVICE AND DRIVING METHOD OF DISPLAY DEVICE", and claims priority to Chinese Application No. 201910094193.4 filed on Jan. 30, 2019, the contents of which are incorporated herein by reference in their entirety.

TECHNICAL FIELD

Embodiments of the present disclosure relate to the field of photoelectron or display technology, and in particular, to a dual-die device, a display device, and a driving method of a display device.

BACKGROUND

With the development of display technology and the wide application of display devices, users have put forward higher requirements on display devices, for example, a requirement to incorporate a function of protecting eyesight in display devices has been raised. In the current liquid crystal display (abbreviated as: LCD) device, an anti-blue light eye protection function has been incorporated into the backlight module.

Because the short-wave blue light in the blue light wave band, i.e., the light in the range of 400 nanometers (nm) to 450 nm, will increase the amount of toxins in the macular region of a human eye and damage the human eye. Therefore, the anti-blue light function is intended to filter out the short-wave blue light of 400 to 450 nm in the blue light emitted by the backlight module, i.e., filter out harmful the blue light wave band. Currently, an anti-blue light film or an anti-blue light chip replacing the blue light chip is generally used as an anti-blue light method.

SUMMARY

In embodiments of the present disclosure, there is provided a dual-die device, comprising:
a first light emitting die for emitting light containing short wave blue light;
a second light emitting die for emitting light from which short wave blue light is filtered out; and
a control circuit,
wherein the control circuit is connected to the first light emitting die and the second light emitting die, and configured to control the first light emitting die or the second light emitting die to be turned on,
According to one embodiment of the present disclosure, the control circuit comprises: a first control circuit connected to the first light emitting die and configured to control the first light emitting die to be turned on or turned off; and a second control circuit connected to the second light emitting die and configured to control the second light emitting die to be turned on or turned off.
According to some embodiments of the present disclosure, the second light emitting die is capable of filtering out blue light having a wavelength in a range from 400 nm to 450 nm.

According to some embodiment of the present disclosure, the dual-die device is configured to switch between turning on of the first light emitting die and turning on of the second light emitting die by the control circuit.
According to some embodiments of the present disclosure, the first light emitting die is located at one end of the dual-die device, and the second light emitting die is located at the other end of the dual-die device.
According to some embodiments of the present disclosure, the dual-die device is configured to only turn on one type of light emitting dies in a time period.
In embodiments of the present disclosure, there is further provided a display device, comprising:
a light guide plate;
a film sheet and a liquid crystal module disposed on a light emitting side of the light guide plate; and
the dual-die device according to any one of the above embodiments disposed on one side of the light guide plate,
wherein the dual-die device is configured to turn on the first light emitting die or the second light emitting die under a control of the control circuit.
According to some embodiments of the present disclosure, the display device is in a normal display mode when the first light emitting die is turned on;
the display device is in an anti-blue light display mode when the second light emitting die is turned on.
According to some embodiments of the present disclosure, the dual-die device is disposed on a side surface of the light guide plate; or the dual-die device is disposed on a side of the light guide plate away from the film sheet.
According to some embodiments of the present disclosure, the display device further comprises a first processing circuit connected to the dual-die device,
wherein the first processing circuit is configured to increase an input current of the dual-die device when the second light emitting die in the dual-die device is turned on.
According to some embodiments of the present disclosure, the display device further comprises:
a third light emitting die disposed on one side of the light guide plate and configured to emit light from which short wave blue light is filter out, and
a second processing circuit,
wherein the second processing circuit is connected to the dual-die device and the third light emitting die, and is configured to turn on the third light emitting die when the second light emitting die in the dual-die device is turned on.
According to some embodiments of the present disclosure, the display device comprises a plurality of the dual-die devices and a plurality of the third light emitting dies, and the dual-die devices and the third light emitting dies are alternately disposed.
According to some embodiments of the present disclosure, the display device further comprises a switch button connected to the control circuit.
In embodiments of the present disclosure, there is further provided a driving method of the display device according to any one of the above embodiments, comprising:
turning on the dual-die device: and
emitting light by the first light emitting die or the second light emitting die in the dual-die device.
According to one embodiment of the present disclosure, in case where the first light emitting die or the second light emitting die is an on going light emitting die in the dual-die device, the method further comprises:
turning off the on going light emitting die in the dual-die device, while turning on a currently-unlighted die in the dual-die device.

According to some embodiments of the present disclosure, the driving method further comprises:

increasing an input current of the dual-die device when the second light emitting die in the dual-die device is turned on to emit light.

According to one embodiment of the present disclosure, the display device further comprise third light emitting die disposed on one side of the light, guide plate and configured to emit light from which short wave blue light is filtered out, and the method also comprises:

turning on the third light emitting die to emit light when the second light emitting die in the dual-die device is turned on to emit light.

In embodiments of the present disclosure, there is further provided a computer readable storage medium for storing an executable instruction, the executable instruction being configured to when executed by a processor.

BRIEF DESCRIPTION OF THE DRAWINGS

The drawings are intended to provide a further understanding of technical solutions of the present disclosure, and constitute a part of the specification, to explain the technical solutions of the present disclosure together with the embodiments of the present disclosure, but do not constitute limitations on the technical solutions of the present disclosure.

DETAILED DESCRIPTION OF EMBODIMENTS

To make the objectives, technical solutions, and advantages of the present disclosure clearer, the embodiments of the present disclosure will be described in detail below with reference to the accompanying drawings. It should be noted that the embodiments and the features in the embodiments in the present disclosure may be arbitrarily combined with each other without conflict.

Figure 1:
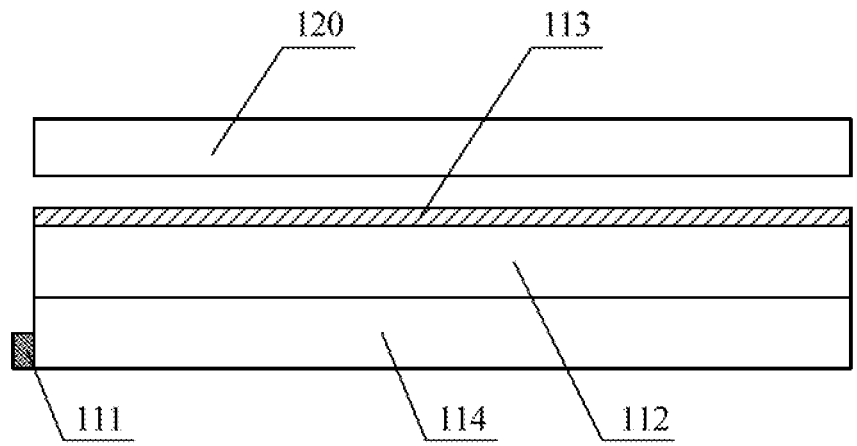
FIG. 1 is a schematic structural view of an LCD display panel.

In order to realize an anti-blue light function of a liquid crystal module, the following two methods may be applied to an anti-blue light LCD device: one is to add an anti-blue light film between a film sheet and the liquid crystal module, this scheme will increase the thickness of the overall device; the other is to replace the blue light chip with an anti-blue light chip to achieve the anti-blue light function. The scheme of adding an anti-blue light film is shown in FIG. 1. FIG. 1 is a schematic structural view of an LCD display panel. In the LCD display panel shown in FIG. 1, the backlight module adopts an edge-lit backlight source, specifically the light source is a blue light emitting diode (LED for short) chip 111 disposed on a side of a light guide plate 114, a layer of anti-blue light film 113 is added or attached between a film sheet 112 of the backlight module and a liquid crystal module 120, and the blue light emitted by the blue LED chip 11 is filtered out by the anti-blue light film 113 to realize the anti-blue light function of the backlight module. However, the addition of the anti-blue light film 113 will inevitably lead to an increase in the thickness of the entire backlight module, which is an inevitable disadvantage for the design of ultra-thin backlight module. The scheme of adopting the anti-blue light chip may be realized in the following ways, for example, the original blue light chip is replaced with an anti-blue light chip, and for example, an anti-blue light fluorescent layer is coated on a surface of the LED chip to perform a short-wave blue light filtering, thereby achieving the anti-blue light function, and for example, blue light with a peak wavelength in a range of 400 nm to 450 nm is absorbed from phosphor powder of the LED chip, thereby achieving the anti-blue light function. It is also possible for the LCD display panel to bond the liquid crystal module with a cover glass by using anti-blue light optical glue, so as to achieve the anti-blue light function. For the above-mentioned anti-blue light technologies, since the light in a blue light wave band from the anti-blue light chip is less, the power of the backlight source needs to be greater to excite white light of the same energy. Obviously, this scheme will increase the power consumption of the LCD device. It can be seen that the anti-blue light LCD device generally has problems of large volume and high power consumption.

In the embodiments of the present disclosure, it provides a dual-die device, a display device, and a driving method of a display device, to solve the problems of large volume and high power consumption in the anti-blue light method of replacing the blue light chip with an anti-blue light film or an anti-blue light chip.

The following specific embodiments in the present disclosure may be combined with each other, and the same or similar concepts or processes may be omitted in some embodiments.

In the present disclosure, the short-wave blue light refers to blue light having a wavelength in a range of 400 nm to 450 nm.

Figure 2:
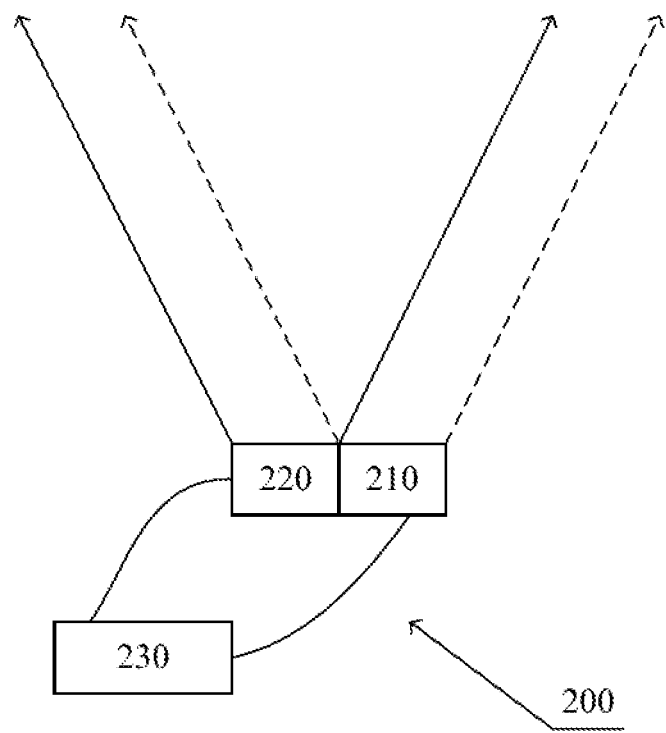
FIG. 2 is a schematic structural view of a dual-die device according to an embodiment of the present disclosure.

FIG. 2 is a schematic structural view of a dual-die device according to an embodiment of the present disclosure. The dual-die device 200 in this embodiment may include: a first light emitting die 210 for emitting light containing blue light, a second light emitting die 220 for emitting light from which short-wave blue light is filtered out, and a control circuit 230.

In the dual-die device 200 according to the embodiments of the present disclosure, the control circuit 230 is connected to the first light emitting die 210 and the second light emitting die 220, and configured to control the first light emitting die 210 or the second light emitting die 220 to be turned on.

The dual-die device 200 according to the embodiments of the present disclosure may be used as a backlight source of an LCD display device, and this backlight source may be used as an edge-lit backlight of the LCD display device or a direct-lit backlight of the LCD display device. The dual-die device 200 not only has a second light emitting die 220 that can effectively prevent blue light, but also has a common first light emitting die 210 that does not have an anti-blue light function, and the first light emitting die 210 and the second light emitting die 220 are not turned on at the same time. In the process of turning on the light emitting dies, the control circuit can only turn on one type of light emitting dies in onetime period, i.e., turn on the first light emitting die 210 or the second light emitting die 220.

In practical applications, since the blue light that may damage human eyes is typically short-wave blue light with a wavelength in a range of 400-450 nm, the role of the second light emitting die 220 is to filter out the short-wave blue light with the wavelength in the range of 400-450 nm from the blue light, but retaining long-wave blue light with a wavelength greater than 450 nm. The light indicated by solid lines in FIG. 2 refers to white light emitted by the second light emitting die 220 with a wavelength greater than 450 nm, and the light indicated by broken lines refers to white light emitted by the first light emitting die 210 with a large amount of short-wave blue light.

It should be noted that the first light emitting die 210 and the second light emitting die 220 in the embodiments of the present disclosure are not only used to emit blue light or long-wave blue light. The first light emitting die 210 and the second light emitting die 220 actually emit white light having the blue light wave band. The difference between the two light emitting dies lies in: the first light emitting die 210 is a conventional blue light chip, that is, the white light emitted by it includes a full-wave band blue light, but the second light emitting die 220 is an anti-blue light chip, that is, in the white light emitted by it, the short-wave blue light is filtered out from the blue light, but the long-wave blue light remains.

Compared with a single blue light chip or anti-blue light chip used independently, the dual-die device 200 in the embodiment of the present disclosure may be used as both a blue light chip (that is, in a condition where the first light emitting die 210 is turned on) and an anti-blue light chip (that is, in a condition where the second light emitting die 220 is turned on), and the two chips may be switched arbitrarily in use. Therefore, when the dual-die device 200 is applied to the backlight module of the LCD display device, the LCD display device may adopt the first light emitting die 210 that does not have the anti-blue light effect as a backlight source, and adopt the second light emitting die 220 that has the anti-blue light effect as a backlight source. When the dual-die device 200 turns on the first light emitting die 210, the LCD display device has a low power consumption performance, and when the dual-die device 200 turns on the second light emitting die 220, the LCD display device has an eye protection function against blue light.

The dual-die device 200 according to the embodiments of the present disclosure includes a first light emitting die 210 for emitting light containing short-wave blue light, a second light emitting die 220 for emitting light in which short-wave blue light is filtered out, and a control circuit 230 connected to the first light emitting die 210 and the second light emitting die 220; the control circuit 230 can control the dual-die device 200 to turn on the first light emitting die 210 or the second light emitting die 220. In a case where the dual-die device 200 according to the embodiments of the present disclosure is applied to a backlight module of an LCD display device, the LCD display device has a low power consumption performance when the first light emitting die 210 is turned on in the dual-die device 200, and the LCD display device has an eye protection function against blue light when the second light emitting die 220 is turned on in the dual-die device 200. Moreover, the LCD display device may be switched between an eye protection mode and a low power consumption mode by the arbitrary switch between the first light emitting die 210 and the second light emitting die 220, thereby solving the ubiquitous problems of large volume and high power consumption caused by the anti-blue light display device in which the anti-blue light film is adopted or the blue light chip is replaced with the anti-blue light chip.

In the embodiment of the present disclosure, the first light emitting die 210 and the second light emitting die 220 in the dual-die device 200 are generally LED chips. In order that the switch between the first light emitting die 210 and the second light emitting die 220 do not affect the brightness of the backlight module in the LCD display so as not to affect user experience, the length of the dual-die device 200 should be as small as possible. For example, the blue light chip (i.e., the first light emitting die 210) is disposed at one end of the dual-die device, and the anti-blue light chip (i.e., the second light emitting die 220) is disposed at the other end of the dual-die device. The overall length of the dual-die device 200 is less than 3.8 millimeters (mm), which means that there is a small distance between the anti-blue light single chip (i.e., the second light emitting die 220) and the single blue light chip (i.e., the first light emitting die 210). In this way, the brightness of the backlight module is consistent in the case where the two chips share the same set of light guide plate dots.

In the dual-die device 200 according to the embodiments of the present disclosure, the first light emitting die 210 without the anti-blue light effect and the second light emitting die 220 with the anti-blue light effect are not turned on simultaneously, that is to say, the first light emitting die 210 and the second light emitting die 220 are controlled by the control circuit 230 to achieve the effect of time-sharing light emission. According to some embodiments of the present disclosure, the above two dies may be controlled by one single control circuit 230 to achieve time-sharing light emission, or may be controlled by respective control circuits 230 to achieve time-sharing light emission.

Figure 3:
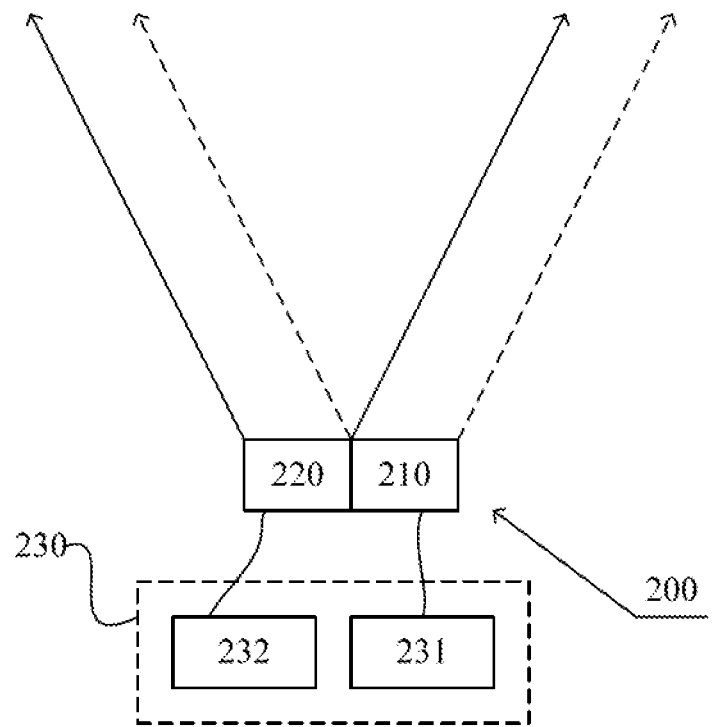
FIG. 3 is a schematic view showing a working principle of a dual-die device according to an embodiment of the present disclosure.
Figure 4:
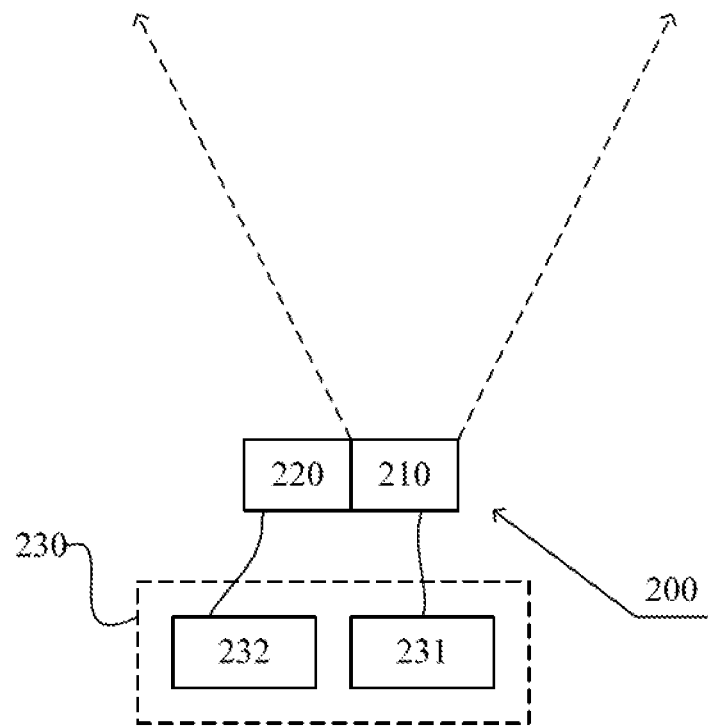
FIG. 4 is a schematic view showing a principle of a dual-die device when a first light emitting die is turned on according to an embodiment of the present disclosure.
Figure 5:
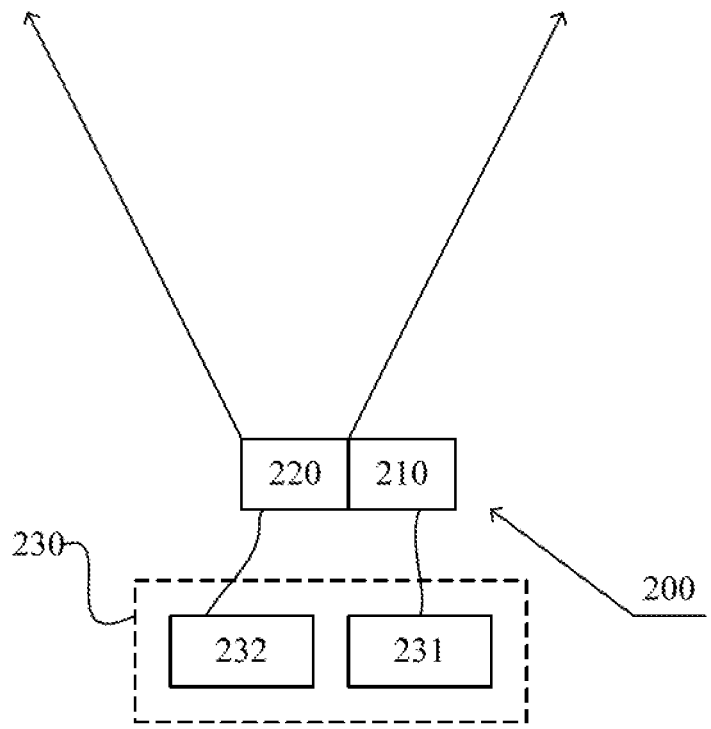
FIG. 5 is a schematic view showing a principle of a dual-die device when a second light emitting die is turned on according to an embodiment of the present disclosure.

FIG. 3 is a schematic view showing a working principle of a dual-die device according to an embodiment of the present disclosure. The control circuit 230 in FIG. 3 may include a first control circuit 231 (i.e., blue light chip control circuit 231) connected to the first light emitting die 210, and a second control circuit 232 (i.e., anti-blue light chip control circuit 232) connected to the second light emitting die 220. The working mode of the dual-die device 200 may be as follows: the first light emitting die 210 is turned on by the first control circuit 231 by default when the dual-die device is turned on. FIG. 4 is a schematic view showing a principle of a dual-die device when a first light emitting die is turned on according to an embodiment of the present disclosure. As shown in FIG. 4, the first light emitting die 210 (that is, the blue light chip) of the dual-die device 200 therein is turned on, at this time, the white light emitted by the dual-die device 200 includes blue light with various wave bands; when the control circuit 230 switches the function of the dual-die device 200, the first light emitting die 210 is turned off by the first control circuit 231, and meanwhile the second light emitting die 220 is turned on by the second control circuit 232 to complete the switching function. FIG. 5 is a schematic view showing a principle of a dual-die device when a second light emitting die is turned on according to an embodiment of the present disclosure. As shown in FIG. 5, the second light emitting die 220 (that is, the anti-blue light chip) of the dual-die device 200 in FIG. 5 is turned on, at this time, the short-wave blue light is filtered out from the white light emitted by the dual-die device 200. In the dual-die devices 200 in FIG. 3 to FIG. 5, the control circuit 230 including circuits which control two dies respectively is taken as an example.

Figure 6:
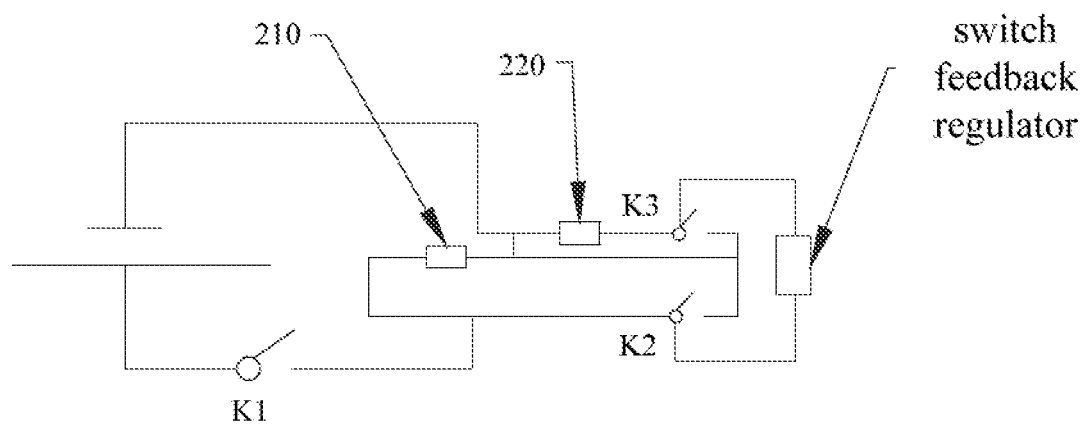
FIG. 6 is a schematic view showing a circuit structure of a dual-die device according to an embodiment of the present disclosure.

S FIG. 6 is a schematic view showing a circuit structure of a dual-die device according to an embodiment of the present disclosure. FIG. 6 illustrates an actual circuit of a dual-die device 200, and shows an example in which two types of dies (the first light emitting die 210 and the second light emitting die 220) are controlled by one set of control circuits 230. The other circuit structures except the first light emitting die 210 and the second light emitting die 220 in FIG. 6 belong to the control circuit 230. The circuits of the first light emitting die 210 and the second light emitting die 220 in the dual-die device 200 should have the following relationship: the light emission of the dual-die device 200 should be controlled by a main switch K1, and a switch feedback regulator is connected between switches K2 and K3. When K1 is switched on and K2 and K3 are switched off, the circuit of the first light emitting die 210 is turned on and the first light emitting die 210 emits light; the control switch of the second light emitting die 220 is coordinated and controlled by feedback from K2 and K3, and when K2 and K3 are simultaneously turned on, the circuit of the first light emitting die 210 will be short-circuited, and the circuit of the second light emitting die 220 is turned on and the second light emitting die 220 emits light, that is, the switch from the first light emitting die 210 to the second light emitting die 220 is realized; and if the first light emitting die 210 is intended to be turned on to emit light again, it just needs to switch off K2 and K3.

When the dual-die device 200 according to the embodiments of the present disclosure is applied to the backlight module of the LCD display device, the combination of the blue light chip (i.e., the first light emitting die 210) and the anti-blue light chip (i.e., the second light emitting die 220) allows users to switch real-time between the eye protection mode (that is, the application scenario where the second light emitting die 220 is turned on) and the low power consumption mode (that is, the application scenario where the first light emitting die 210 is turned on), thereby allowing users to obtain better experience according to actual needs.

Figure 7:
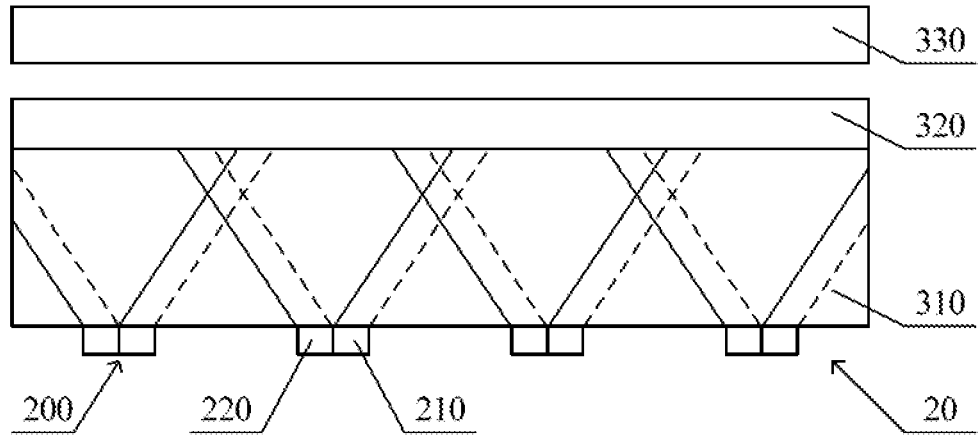
FIG. 7 is a schematic structural view of a display device according to an embodiment of the present disclosure.

Based on the dual-die device 200 according to the above embodiments of the present disclosure, the present disclosure also provides a display device 20. As shown in FIG. 7, it is a schematic structural view of a display device according to an embodiment of the present disclosure. The display device 20 according to the embodiment of the present disclosure adopts the above-mentioned dual-die device 200 as a part of its backlight source, that is, the display device is an LCD display device, and may include: a light guide plate 310, a film sheet 320 and a liquid crystal module 330 disposed on a light emitting side of the light guide plate, and a dual-die device 200 disposed on a side of the light guide plate 310. The dual-die device 200 is the dual-die device 200 provided in any one of the above embodiments shown in FIG. 2 to FIG. 6.

In the embodiments of the present disclosure, the first light emitting die 210 or the second light emitting die 220 is turned on by the control of the control circuit 230.

The display device 20 according to the embodiments of the present disclosure is an LCD display device capable of realizing the anti-blue light function. The display device may be a painted screen device, for example, Igallery (a product name of a painted screen), a smart phone, a tablet computer or any other devices. The backlight module of the display device 20 adopts the dual-die device 200 provided in any of the above embodiments of the present disclosure as a backlight source. The backlight module includes a light guide plate 310, a film sheet 320, and a dual-die device 200. Based on the structure and functional characteristics of the dual-die device 200, when the dual-die device 200 is used as the backlight source of the display device 20, the light emitting characteristics of the first light emitting die 210 and the second light emitting die 220 in the dual-die device 200 may be utilized to realize the different display modes of the display device 20. The display device 20 is in an anti-blue light display mode when the second light emitting die 220 with anti-blue light performance emits light, at this time, the display device 20 has the anti-blue light eye protection function. The display device 20 is in a normal display mode when the first light emitting die 210 without anti-blue light performance emits light, at this time, the display device 20 does not have an anti-blue light function, but has a low power consumption performance.

It should be noted that, in the embodiments of the present disclosure, the switch between the first light emitting die 210 and the second light emitting die 220 during operation can also be implemented by the control circuit 230 in the dual-die device 200. The control circuit 230 may be a circuit which can simultaneously control the two dies, or may include two circuits for controlling the first light emitting die 210 and the second light emitting die 220 respectively. In the above embodiments, the implementation modes of the control circuit 230 including an over design mode or a separate design mode have been described, therefore they will not be repeated here.

In the embodiments of the present disclosure, the working process of the display device 20 may be as follows: when the display device 20 is turned on, the backlight source is turned on, that is, the dual-die device 200 is turned on, and the system of the display device 20 simultaneously turns on the first light emitting dies of all the dual-die devices 200 in the display device 20 by default, i.e., the initial display mode of the backlight module is a low power consumption mode; if the user finds that the power of the display device 20 is sufficient but his eyes are tired, the user can switch the light emitting mode of the display device 20 to an anti-blue light eye protection mode, for example, all the first light emitting dies 210 may be turned off and all the second light emitting dies 220 may be turned on at the same time under the control of the control circuit 230, the switching principle of the second light emitting dies 220 in the dual-die devices 200 is shown in FIG. 5; if the user finds that the power of the display device 20 is insufficient and it needs to enter the low power consumption mode, the user can switch the light emitting mode of the display device 20 to the low power consumption mode, for example, all the second light emitting dies 220 may be turned off and all the first light emitting dies 210 are turned on at the same time under the control of control circuit 230, the switching principle of the first light emitting dies 210 in the dual-die devices 200 is shown in FIG. 4.

The backlight source of the LCD device is generally an edge-lit backlight source or a direct-lit backlight source. If the backlight source does not have an anti-blue light function, the LCD device does not have an anti-blue light function. The anti-blue light method of the anti-blue light LCD device usually adopts an anti-blue light film or replaces the blue light chip with the anti-blue light chip. On one hand, the anti-blue light film would increase the thickness of the overall device, on the other hand, in the above two anti-blue light methods, the backlight source can only be used as an anti-blue light chip, and cannot provide both the anti-blue light function (in the case of eye protection requirement) and the normal display function (in the case of low power consumption requirement), that is, it cannot realize the real-time switch between the anti-blue light eye protection mode and the low power consumption mode. In contrast, the display device 20 according to the embodiments of the present disclosure adopts the dual-die device 200 as the backlight source in the backlight module. Based on the fact that the dual-die device 200 has the hardware structures of an anti-blue light chip (i.e., the second light emitting die 220) and a blue light chip (i.e., the first light emitting die 210) and the above two chips can be arbitrarily switched to emit light, when the blue light chip is turned on by the control of the control circuit 230 of the dual-die device 200 in the display device 20, the blue light chip emits short-wave blue light (wavelength in a range of about 400 nm-450 nm), phosphor is excited to emit white light with more short-wave blue light, at this time, the backlight module displays normally; when the blue light chip is turned off by the control of the control circuit 230 and the anti-blue light chip is switched to emit light, the anti-blue light chip emits long-wave blue light with a wavelength greater than 450 mu, and the phosphor is excited to emit white light with less short-wave blue light, thereby achieving the eye protection function. Obviously, the display device 20 according to the embodiments of the present disclosure can arbitrarily switch the light emitting die between the blue light chip and the anti-blue light chip, thereby realizing arbitrary switch between the anti-blue light eye protection mode and the low power consumption mode, and the selection of the eye protection mode or the power saving mode according to the needs of users.

The display device 20 according to the embodiments of the present disclosure includes a light guide plate 310, a film sheet 320 and a liquid crystal module 330 disposed on a light emitting side of the light guide plate 310, and a dual-die device 200 disposed on a side of the light guide plate 310. The dual-die device 200 includes a first light emitting die 210 for emitting light containing short-wave blue light, a second light emitting die 220 for emitting light in which short-wave blue light is filtered out, and a control circuit 230 connected to the first light emitting die 210 and the second light emitting die 220, the dual-die device 200 can turn on the first light emitting die 210 or the second light emitting die 220 by the control of the control circuit 230. Therefore, for the display device 20 according to the embodiments of the present disclosure, the display device 20 has a low power consumption performance when the first light emitting die 210 is turned on by the dual-die device 200, and the display device 20 has an eye protection function against blue light when the second light emitting die 220 is turned on by the dual-die device 200. Moreover, the display device 20 may be switched between an eye protection mode and a low power consumption mode by the arbitrary switch between the first light emitting die 210 and the second light emitting die 220, thereby solving the ubiquitous problems of large volume and high power consumption caused by the anti-blue light display device in which the anti-blue light film is adopted or the blue light chip is replaced with the anti-blue light chip.

In addition, in the display device 20 according to the embodiments of the present disclosure, the blue light chip and the anti-blue light chip adopt an integrated design, that is, they are integrated in a dual-die device 200. The dual-die device 200 selectively turns on one of the chips, that is, the blue light chip and the anti-blue light chip share one light guide plate 310 and its dot layout. In this way, during the switch between the blue light chip and the anti-blue light chip, that is, during the switch between the anti-blue eye protection mode and the low power consumption mode, the consistency of the overall brightness of the picture displayed by the display device 20 before and after the switch is high.

It has been described in the above embodiments that the backlight module of the display device 20 in the embodiments of the present disclosure may adopt an edge-lit backlight source or a direct-lit backlight source. Referring to FIG. 7, the dual-die device in FIG. 7 is located on a side of the light guide plate 310 away from the film sheet 320, and the display device 20 in FIG. 7 is shown by taking a direct-lit backlight source as an example.

Figure 8:
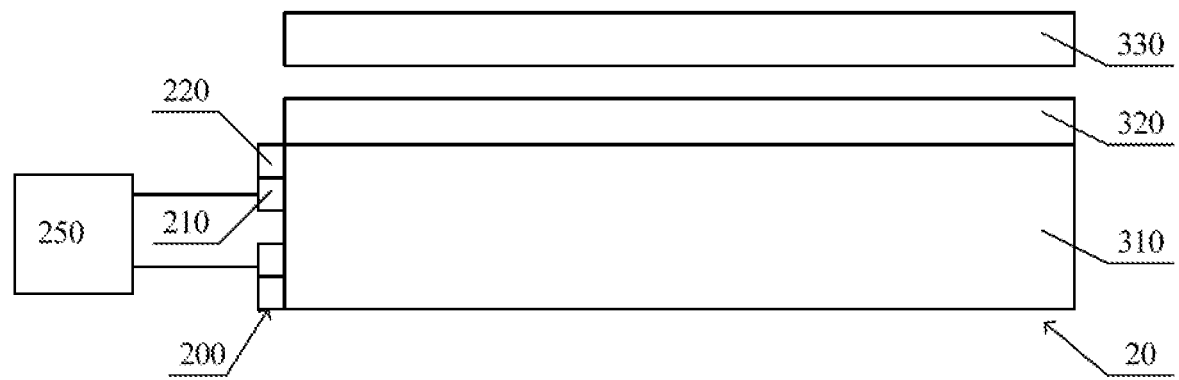
FIG. 8 is a schematic structural view of a display device according to an embodiment of the present disclosure.

As shown in FIG. 8, it is a schematic structural view of a display device according to another embodiment of the present disclosure. In FIG. 8, the dual-die device 200 is disposed on the left side of the light guide plate 310, and therefore it illustrates a structure of a display device 20 that adopts an edge-lit backlight source.

In this embodiment of the present disclosure, the display device may further include a first processing circuit 250 connected to the dual-die device 200.

The first processing circuit 250 is configured to increase an input current of the dual-die device 200 when the second light emitting die 220 in the dual-die device 200 is turned on.

In the display device 20 according to the embodiment of the present disclosure, in the anti-blue light eye protection mode, the anti-blue light chip (i.e., the second light emitting die 220) can only excite blue light with a wavelength greater than 450 nm. In order to obtain the white light with the same brightness as that generated when the blue light chip (i.e., the first light emitting die 210) excites the phosphor, the first processing circuit 250 can be made and controlled to input a larger current and voltage to the dual-die device 200 from the external, to ensure that the overall brightness of the display device 20 does not decrease in the anti-blue light mode. That is, in the anti-blue light mode, the power consumption of the backlight module of the display device 20 increases.

Figure 9:
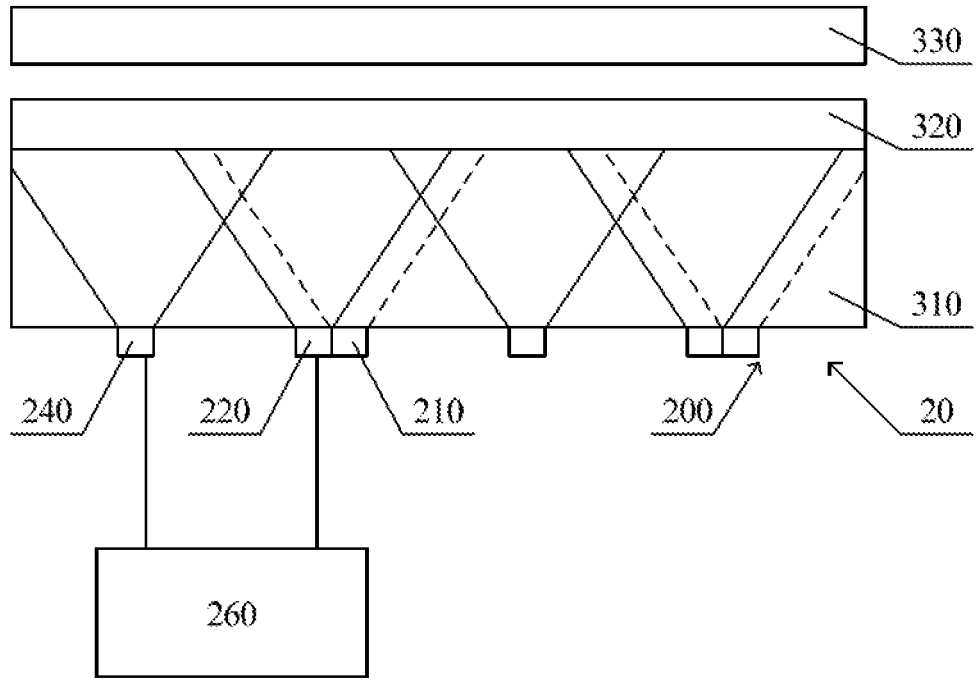
FIG. 9 is a schematic structural view of a display device according to an embodiment of the present disclosure.

In the embodiments of the present disclosure, not only the above method of increasing the input current may be used to ensure that the brightness in the anti-blue light mode is the same as the brightness in the blue light mode, other methods may be adopted, as shown in FIG. 9, which is a schematic structural view of a display device according to a further embodiment of the present disclosure. Based on the structure of the display device 20 shown in FIG. 7, the display device 20 according to this embodiment of the present disclosure may further include: a third light emitting die 240 disposed on a side of the light guide plate 310 and configured for emitting light in which short-wave blue light is filtered out; and a second processing circuit 260.

The second processing circuit 260 in the embodiment of the present disclosure is connected to the dual-die device 200 and the third light emitting die 240, and configured to turn on the third light emitting die 240 when the second light emitting die 220 in the dual-die device 200 is turned on.

In the embodiments of the present disclosure, the backlight source in the backlight module of the display device 20 may not only include a dual-die device, but also include a third light emitting die 240 whose light emitting type is the same as that of the second light emitting die 220, the third light emitting die and the second light emitting die ban both filter out the short-wave blue light which is harmful to human eyes, and the third light emitting die 240 may be arranged in a similar manner to the dual-die device 200, for example, they both act as a edge-lit backlight source, or both act as a direct-lit backlight source. In terms of arrangement, the backlight source of the entire display device 20 is dominated by the dual-die device 200, and the third light emitting die 240 acts as a compensation light emitting die in the anti-blue light mode, and may be arranged at intervals between the dual-die devices 200, that is, the dual-die devices and the third light emitting dies are alternately arranged to improve the phenomenon of insufficient brightness in the anti-blue light mode, thereby avoiding the phenomenon of significant difference in brightness when the display device 20 switches between the anti-blue light mode and the low power consumption mode.

In the embodiments of the present disclosure, for the convenience of the user to realize one-pressure/one-click switch between the anti-blue light mode and the low power consumption mode, a switch button may be provided on a display screen or a casing of the display device 20, the switch button is connected to the control circuit 230 in the dual-die device 200. Each time the switch button is pressed or clicked, the currently-lighted die in the dual-die device 200 is turned off, and the currently-unlighted die is turned on at the same time, that is, the mode of the display device 20 is switched from the anti-blue light mode to the low power consumption mode, or from the low power consumption mode to the anti-blue light mode.

Figure 10:
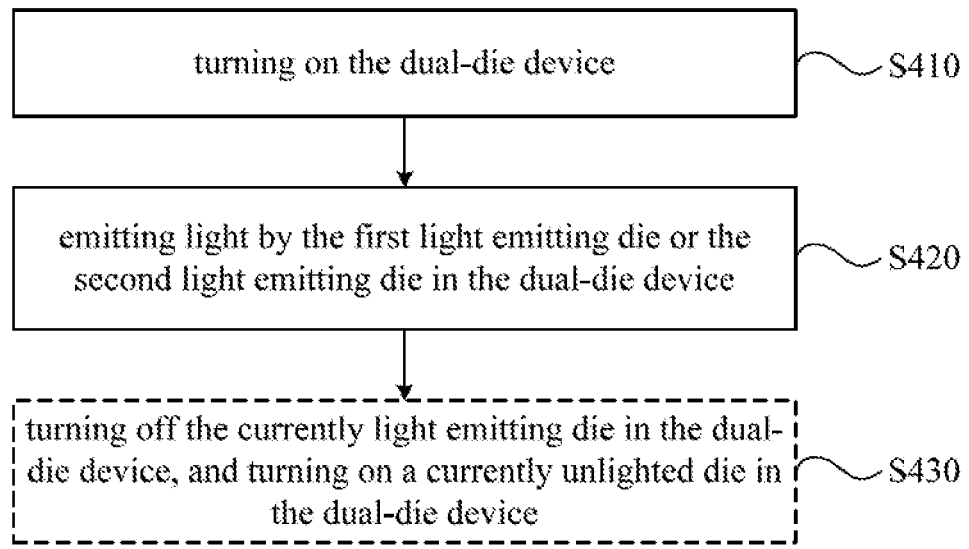
FIG. 10 is a flowchart of a driving method of a display device according to an embodiment of the present disclosure.

Based on the display device 20 according to the above embodiments of the present disclosure, the present disclosure also provides a driving method of a display device, which is performed by the display device according to any one of the above embodiments of the present disclosure. As shown in FIG. 10, which is a flowchart of a driving method of a display device according to an embodiment of the present disclosure, the driving method includes the following steps:

S410: turning on the dual-die device;

S420: emitting light by the first light emitting die or the second light emitting die in the dual-die device.

The driving method according to the embodiments of the present disclosure is performed by the display device 20 according to any one of the above embodiments shown in FIGS. 7 to 9. The type, the specific structure, and the functions of various components and modules of the display device 20 have been described in detail in the above embodiments, therefore they will not be repeated here. The performing premise of the driving method in the embodiments of the present disclosure is as follows: firstly, the dual-die device needs to be turned on, that is, the backlight source of the display device 20 needs to be turned on, and it only makes sense to drive after the backlight source is turned on. After the dual-die device is turned on, light is emitted to enter the light guide plate and evenly diffuse in the light guide plate. In addition, after the dual-die device in the display device is turned on, only one type of the dies (for example, the first light emitting die or the second light emitting die) emits light, and the current light emitting dies of the dual-die devices in the display device are of the same type, that is, the light emitting dies in the display device are the first light emitting dies or the second light emitting dies at one and the same time period. In practical applications, when the second light emitting die with an anti-blue light performance is used for light emission, the display device has an anti-blue light function; when the first light emitting die without an anti-blue light performance is used for light emission, the display device does not have an anti-blue light function, but has a low power consumption performance.

In practical applications, when the display device is turned on, the currently light-emitting die in the dual-die device of the backlight module may be the first light emitting die or the second light emitting die. In the driving method according to the embodiments of the present disclosure, the light emitting mode of the display device may be arbitrarily switched, that is, the driving method may include:

S430: turning off the currently light emitting die in the dual-die device, and turning on a currently unlighted die in the dual-die device.

The driving method according to the embodiments of the present disclosure realizes the switch of the light emitting mode of the display device through the switching use of different types of dies in the dual-die device. The driving process of the display device may be as follows: when the display device is turned on, the backlight source is turned on, that is, the dual-die devices are turned on; the system of the display device simultaneously turns on the first light emitting dies of all the dual-die devices in the display device by default, that is, the initial display mode of the backlight module is a low power consumption mode; if the user finds that the power of the display device is relatively sufficient, but his eyes are tired, the user can switch the light emitting mode of the display device to the anti-blue eye protection mode, for example, all the first light emitting die may be turned off and all the second light emitting dies may be turned on at the same time under the control of the control circuit, the switching principle of the second light emitting dies in the dual-die device 200 is shown in FIG. 5; if the user finds that the power of the display device is insufficient and it needs to enter the low power consumption mode, the user can switch the light emitting mode of the display device to the low power consumption mode, for example, all the second light emitting dies may be turned off and all the first light emitting dies are turned on at the same time under the control of control circuit, the switching principle of the first light emitting dies in the dual-die device is shown in FIG. 4.

The backlight source of the LCD device is generally an edge-lit backlight source or a direct-lit backlight source. If the backlight source does not have an anti-blue light function, the LCD device does not have an anti-blue light function. The anti-blue light method of the anti-blue light LCD device usually adopts an anti-blue light film or replaces the blue light chip with the anti-blue light chip. On one hand, the blue light film would increase the thickness of the overall device, on the other hand, in the above two anti-blue light methods, the backlight source can only be used as an anti-blue light chip, and cannot provide both the anti-blue light function (in the case of eye protection requirement) and the normal display function (in the case of low power consumption requirement), that is, it cannot realize the real-time switch between the anti-blue light eye protection mode and the low power consumption mode. In contrast, in the driving method according to the embodiments of the present disclosure, the display device for performing the driving method adopts the dual-die device as the backlight source in the backlight module. Based on the fact that the dual-die device has the hardware structures of an anti-blue light chip (i.e., the second light emitting die) and a blue light chip (i.e., the first light emitting die) and the above two chips can be arbitrarily switched to emit light, when the blue light chip is turned on by the control of the control circuit of the dual-die device in the display device, the blue light chip emits short-wave blue light (wavelength in a range of about 400 nm 450 nm), phosphor is excited to emit white light with more short-wave blue light, at this time, the backlight module displays normally; when the blue light chip is turned off by the control of the control circuit and the anti-blue chip is switched to emit light, the anti-blue light chip emits long-wave blue light with a wavelength greater than 450 nm, and the phosphor is excited to emit white light with less short-wave blue light, thereby achieving the eye protection function. Obviously, the driving method of the display device according to the embodiments of the present disclosure can arbitrarily switch the light emitting die between the blue light chip or the anti-blue light chip, thereby realizing arbitrary switch between the anti-blue light eye protection mode and the low power consumption mode, and the selection of the eye protection mode or the power saving mode according to the needs of users.

The driving method of the display device according to the embodiments of the present disclosure is based on the hardware structure of the display device in the above embodiments. The dual-die device is turned on when displaying, and light emission is performed by the first light emitting die or the second light emitting die in the dual-die device, wherein the first light emitting die can emit white light containing short-wave blue light, and the second light emitting die can filter out short-wave blue light in the white light. That is, in the driving method of the display device according to the embodiments of the present disclosure, the display device has a low power consumption performance when the first light emitting die is turned on in the dual-die device, and the display device has an eye protection function against blue light when the second light emitting die is turned on in the dual-die device. Moreover, the display device may be switched between an eye protection mode and a low power consumption mode by the arbitrary switch between the first light emitting die and the second light emitting die, thereby solving the ubiquitous problems of large volume and high power consumption caused by the anti-blue light display device in which the anti-blue light film is adopted or the blue light chip is replaced with the anti-blue light chip.

In addition, in the display device according to the embodiments of the present disclosure, the blue light chip and the anti-blue light chip adopt an integrated design, that is, they are integrated in a dual-die device. The dual-die device selectively turns on one of the chips, that is, the blue light chip and the anti-blue light chip share one light guide plate and its dot layout. In this way, during the switch between the blue light chip and the anti-blue light chip, that is, during the switch between the anti-blue eye protection mode and the low power consumption mode, the consistency of the overall brightness of the picture displayed by the display device before and after the switch is high.

The driving method according to the embodiments of the present disclosure may further include:

increasing an input current of the dual-die device when the second light emitting die in the dual-die device is turned on to emit light.

In the display device according to the embodiment of the present disclosure, in the anti-blue light eye protection mode, the anti-blue light chip (i.e., the second light emitting die) can only excite blue light with a wavelength greater than 450 nm. In order to obtain the white light with the same brightness as that generated when the blue light chip (i.e., the first light emitting die) excites the phosphor, a larger current and voltage may be input to the dual-die device from the external, to ensure that the overall brightness of the display device does not decrease in the anti-blue light mode. That is, in the anti-blue light mode, the power consumption of the backlight module of the display device increases.

In the embodiments of the present disclosure, not only the above method of increasing the input current may be used to ensure that the brightness in the anti-blue light mode is the same as the brightness in the blue light mode, other methods may be adopted, for example, the backlight source of the display device not only includes a dual-die device, but also includes a third light emitting die disposed on a side of the light guide plate for emitting light in which short-wave blue light is filtered out, then the driving method according to the embodiments of the present disclosure may further include:

turning on the third light emitting die to emit light when the second light emitting die in the dual-die device is turned on to emit light.

In the embodiments of the present disclosure, the backlight source in the backlight module of the display device may not only include a dual-die device, but also include a third light emitting die whose light emitting type is the same as that of the second light emitting die, the third light emitting die and the second light emitting die both can filter out the short-wave blue light which is harmful to human eyes, and the third light emitting die may be arranged in a similar manner to the dual-die device, for example, they both act as a edge-lit backlight source, or both act as a direct-lit backlight source. In tens of arrangement, the backlight source of the entire display device is dominated by the dual-die device, and the third light emitting die acts as a compensation light emitting die in the anti-blue light mode, and may be arranged at intervals between the dual-die devices, to improve the phenomenon of insufficient brightness in the anti-blue light mode, thereby avoiding the phenomenon of significant difference in brightness when the display device switches between the anti-blue light mode and the low power consumption mode.

According to the display device and the driving method thereof provided by the embodiments of the present disclosure, the display device includes a light guide plate, a film sheet and a liquid crystal module disposed on a light emitting side of the light guide plate, and a dual-die device disposed on a side of the light guide plate. The dual-die device includes a first light emitting die for emitting light containing short-wave blue light, a second light emitting die for emitting light in which short-wave blue light is filtered out, and a control circuit connected to the first light emitting die and the second light emitting die, the dual-die device can turn on the first light emitting die or the second light emitting die by the control of the control circuit. Therefore, for the display device according to the embodiments of the present disclosure, the display device has a low power consumption performance when the first light emitting die is turned on in the dual-die device, and the display device has an eye protection function against blue light when the second light emitting die is turned on in the dual-die device. Moreover, the display device may be switched between an eye protection mode and a low power consumption mode by the arbitrary switch between the first light emitting die and the second light emitting die, thereby solving the ubiquitous problems of large volume and high power consumption caused by the anti-blue light display device in which the anti-blue light film is adopted or the blue light chip is replaced with the anti-blue light chip. In addition, in the display device according to the embodiments of the present disclosure, the blue light chip and the anti-blue light chip adopt an integrated design, that is, they are integrated in a dual-die device. The dual-die device selectively turns on one of the chips, that is, the blue light chip and the anti-blue light chip share one light guide plate and its dot layout. In this way, during the switch between the blue light chip and the anti-blue light chip, that is, during the switch between the anti-blue eye protection mode and the low power consumption mode, the consistency of the overall brightness of the picture displayed by the display device before and after the switch is high.

Figure 11:
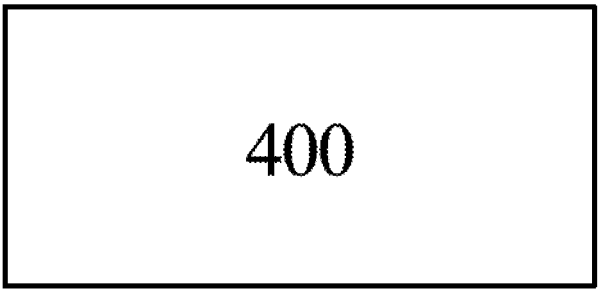
FIG. 11 is a schematic view of a computer-readable storage medium according to an embodiment of the present disclosure.

In the embodiments of the present disclosure, it further provides a computer-readable storage medium 400. As shown in FIG. 11, the computer-readable storage medium 400 stores executable instructions, the executable instructions are configured to implement the driving method of the display device according to any one of the above embodiments when executed by a processor. The driving method of the display device may be used to drive the display device according to the above embodiments of the present disclosure for display, and enable the display device to arbitrarily implement switch between the anti-blue light mode and the low power consumption mode. The implementation of the computer-readable storage medium according to the embodiments of the present disclosure is basically the same as the driving method of the display device according to the above embodiments of the present disclosure, and it will not be described herein.

It should be appreciated by those skilled in the art that the present disclose includes devices for performing one or more of operations described in the present application. These devices may be specially designed and manufactured for the required purpose, or may include known devices in general-purpose computers. These devices have computer programs stored therein, these computer programs are selectively activated or reconstructed. Such computer programs may be stored in a device (for example, computer) readable medium or any type of medium suitable for storing electronic instructions and coupled to a bus. The computer-readable medium includes but is not limited to any types of disks (including a floppy disk, hard disk, optical disk, CD-ROM, and magneto-optical disk), ROM (Read-Only Memory), RAM (Random Access Memory), and EPROM (Erasable Programmable Read-Only Memory), EEPROM (Electrically Erasable Programmable Read-Only Memory), flash memory, magnetic card or optical card. That is, the readable medium includes any medium that stores or transmits information and is readable by a device (for example, a computer).

In the embodiments of the present disclosure, the components "controller" and "thermostat" may be implemented by one or more logic operation processing circuits, and the logic operation processing circuit may be in the form of a processor, for example, it may be a central processing unit (referred to as CPU), an application specific integrated circuit (referred to as ASIC), a digital signal processor (referred to as DSP), a field programmable gate array (referred to as FPGA), a single-chip microcomputer (MCU), or the like. The component "storage device" may refer to one or more storage elements, for example, it may be a random access memory (RAM), a non-volatile memory, a disk storage, a flash memory or the like.

Although the embodiments disclosed in the present disclosure are as described above, the embodiments are exemplary for easy understanding of the present disclosure, and are not intended to limit the present disclosure. Modifications and changes may be made by those skilled in the art in the forms and details of implementation without departing from the spirit and scope of the present disclosure, but the scope of the present disclosure is defined by the appended claims.

What is claimed is:

1. A display device, comprising:
a light guide plate;
a film sheet and a liquid crystal module disposed on a light emitting side of the light guide plate;
a plurality of dual-die devices disposed on one side of the light guide plate,
wherein each of the dual-die devices comprises:
a first light emitting die for emitting first white light,
a second light emitting die for emitting second white light with short-wave blue light filtered out, and
a control circuit connected to the first light emitting die and the second light emitting die and configured to control the first light emitting die or the second light emitting die to be turned on,
wherein the first light emitting die and the second light emitting die are integrated together so that the first light emitting die and the second light emitting die correspond to a same dot layout of the light guide plate;
a plurality of third light emitting dies disposed on a same side of the light guide plate as the dual-die devices and separated from the dual-die devices, and configured to emit third white light with short-wave blue light filter filtered out,
wherein the each of the dual-die devices is configured to only turn on one type of the first light emitting die and the second light emitting die in a time period, and each of the plurality of third light emitting dies is configured to be turned on at the same time as the second light emitting die in the each of the dual-die devices, and
the plurality of dual-die devices and the plurality of third light emitting dies are alternately disposed.

2. The display device according to claim 1, wherein the control circuit comprises: a first control circuit connected to the first light emitting die and configured to control the first light emitting die to be turned on or turned off; and a second control circuit connected to the second light emitting die and configured to control the second light emitting die to be turned on or turned off.

3. The display device according to claim 1, wherein the second light emitting die is capable of filtering out blue light having a wavelength in a range from 400 nm to 450 nm.

4. The display device according to claim 1, wherein the dual-die device has a length less than 3.8 millimeters.

5. The display device according to claim 1, wherein the dual-die device is configured to switch between turning on of the first light emitting die and turning on of the second light emitting die by the control circuit.

6. The display device according to claim 1, wherein the first light emitting die is located at one end of the dual-die device, and the second light emitting die is located at the other end of the dual-die device.

7. A display device, comprising:
a light guide plate;
a film sheet and a liquid crystal module disposed on a light emitting side of the light guide plate; and
the dual-die device according to claim 1 disposed on one side of the light guide plate,
wherein the dual-die device is configured to turn on the first light emitting die or the second light emitting die under a control of the control circuit.

8. The display device according to claim 7, wherein
the display device is in a normal display mode when the first light emitting die is turned on;
the display device is in an anti-blue light display mode when the second light emitting die is turned on.

9. The display device according to claim 7, wherein the dual-die device is disposed on a side surface of the light guide plate; or the dual-die device is disposed on a side of the light guide plate away from the film sheet.

10. The display device according to claim 7, further comprising a first processing circuit connected to the dual-die device,
wherein the first processing circuit is configured to increase an input current of the dual-die device when the second light emitting die in the dual-die device is turned on.

11. The display device according to claim 7, further comprising:
a third light emitting die disposed on one side of the light guide plate and configured to emit light from which short-wave blue light is filter out, and
a second processing circuit,
wherein the second processing circuit is connected to the dual-die device and the third light emitting die, and is configured to turn on the third light emitting die when the second light emitting die in the dual-die device is turned on.

12. The display device according to claim 11, wherein the display device comprises a plurality of the dual-die devices and a plurality of the third light emitting dies, and the dual-die devices and the third light emitting dies are alternately disposed.

13. The display device according to claim 7, further comprising a switch button connected to the control circuit.

14. The display device according to claim 1, wherein the control circuit comprises: a first control circuit connected to the first light emitting die and configured to control the first light emitting die to be turned on or turned off; and a second control circuit connected to the second light emitting die and configured to control the second light emitting die to be turned on or turned off,
wherein the second light emitting die is capable of filtering out blue light having a wavelength in a range from 400 nm to 450 nm, the dual-die device has a length less than 3.8 millimeters,
wherein the dual-die device is configured to switch between turning on of the first light emitting die and turning on of the second light emitting die by the control circuit, the first light emitting die is located at one end of the dual-die device, and the second light emitting die is located at the other end of the dual-die device.

15. The display device according to claim 1, wherein
the display device is in a normal display mode when the first light emitting die is turned on;
the display device is in an anti-blue light display mode when the second light emitting die is turned on.

16. The display device according to claim 1, wherein the dual-die device is disposed on a side surface of the light guide plate; or the dual-die device is disposed on a side of the light guide plate away from the film sheet.

17. The display device according to claim 1, further comprising a first processing circuit connected to the dual-die device,
wherein the first processing circuit is configured to increase an input current of the dual-die device when the second light emitting die in the dual-die device is turned on.

18. The display device according to claim 1, further comprising:
a second processing circuit,
wherein the second processing circuit is connected to the dual-die device and the third light emitting die, and is configured to turn on the third light emitting die when the second light emitting die in the dual-die device is turned on.

19. The display device according to claim 1, further comprising a switch button connected to the control circuit.

20. A driving method of a display device, the display device comprising a light guide plate; a film sheet and a liquid crystal module disposed on a light emitting side of the light guide plate; a plurality of dual-die devices disposed on one side of the light guide plate; a plurality of third light emitting dies disposed on a same side of the light guide plate as the dual-die devices and separated from the dual-die devices, and configured to emit third white light with short-wave blue light filtered out,
the method comprising:
turning on the plurality of dual-die devices, wherein each of the dual-die devices comprises: a first light emitting die for emitting first white light, a second light emitting die for emitting second white light with short-wave blue light filtered out, and a control circuit connected to the first light emitting die and the second light emitting die and configured to control the first light emitting die or the second light emitting die to be turned on, wherein the first light emitting die and the second light emitting die are integrated together so that the first light emitting die and the second light emitting die correspond to a same dot layout of the light guide plate; and
emitting the first white light by the first light emitting die or emitting the second white light from with short-wave blue light filtered out by the second light emitting die and the plurality of third light emitting dies.

21. The driving method according to claim 20, wherein in case where the first light emitting die or the second light emitting die is an on-going light-emitting die in the dual-die device, the method further comprises:
turning off the on-going light-emitting die in the dual-die device, while turning on a currently-unlighted die in the dual-die device.

22. The driving method according to claim 20, further comprising:
increasing an input current of the dual-die device when the second light emitting die in the dual-die device is turned on to emit light.

23. The driving method according to claim 20, wherein the method also comprises:
turning on the third light emitting die to emit light when the second light emitting die in the dual-die device is turned on to emit light.

24. A non-transitory computer-readable storage medium for storing an executable instruction, the executable instruction being configured to implement the driving method of the display device according to claim 20 when executed by a processor.

* * * * *